US012659246B2

(12) United States Patent (10) Patent No.: US 12,659,246 B2
Khafizov et al. (45) Date of Patent: Jun. 16, 2026

(54) USER EQUIPMENT IMPACT ESTIMATION AND REMEDIATION

(71) Applicant: Verizon Patent and Licensing Inc., Basking Ridge, NJ (US)

(72) Inventors: Farid Khafizov, Plano, TX (US); Artur Safin, Conroe, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 307 days.

(21) Appl. No.: 18/236,459

(22) Filed: Aug. 22, 2023

(65) Prior Publication Data

US 2025/0071035 A1 Feb. 27, 2025

(51) Int. Cl.
*H04L 43/0811* (2022.01)
*H04W 52/02* (2009.01)

(52) U.S. Cl.
CPC ..... *H04L 43/0811* (2013.01); *H04W 52/0245* (2013.01)

(58) Field of Classification Search
CPC ...................... H04W 52/0245; H04L 43/0811
See application file for complete search history.

(56) References Cited

U.S. PATENT DOCUMENTS

| | | | | |
|---|---|---|---|---|
| 7,631,225 B2* | 12/2009 | Dini | ...................... | G06F 11/008 |
| | | | | 714/43 |
| 7,813,321 B2* | 10/2010 | Pecen | ................... | H04W 48/18 |
| | | | | 370/335 |
| 9,743,300 B2* | 8/2017 | Zhang | ................... | H04W 24/08 |
| 2021/0352708 A1* | 11/2021 | Seo | ................... | H04W 52/0216 |
| 2025/0061338 A1* | 2/2025 | Olsson | ................... | G06N 3/092 |

* cited by examiner

*Primary Examiner* — Romani Ohri

(57) ABSTRACT

One or more computing devices, systems, and/or methods for estimating the impact of communication device failures of a communication network are provided. Energy consumption data over a time interval of when an alarm of a communication device failure occurred is evaluated to identify change points relating to threshold changes in energy consumption by user equipment. The change points are used to identify stable energy level intervals. Key performance indicators are sampled along the stable energy level intervals and are compared to identify an impact of the failure upon the user equipment connected to the communication network.

20 Claims, 10 Drawing Sheets

Figure 2:
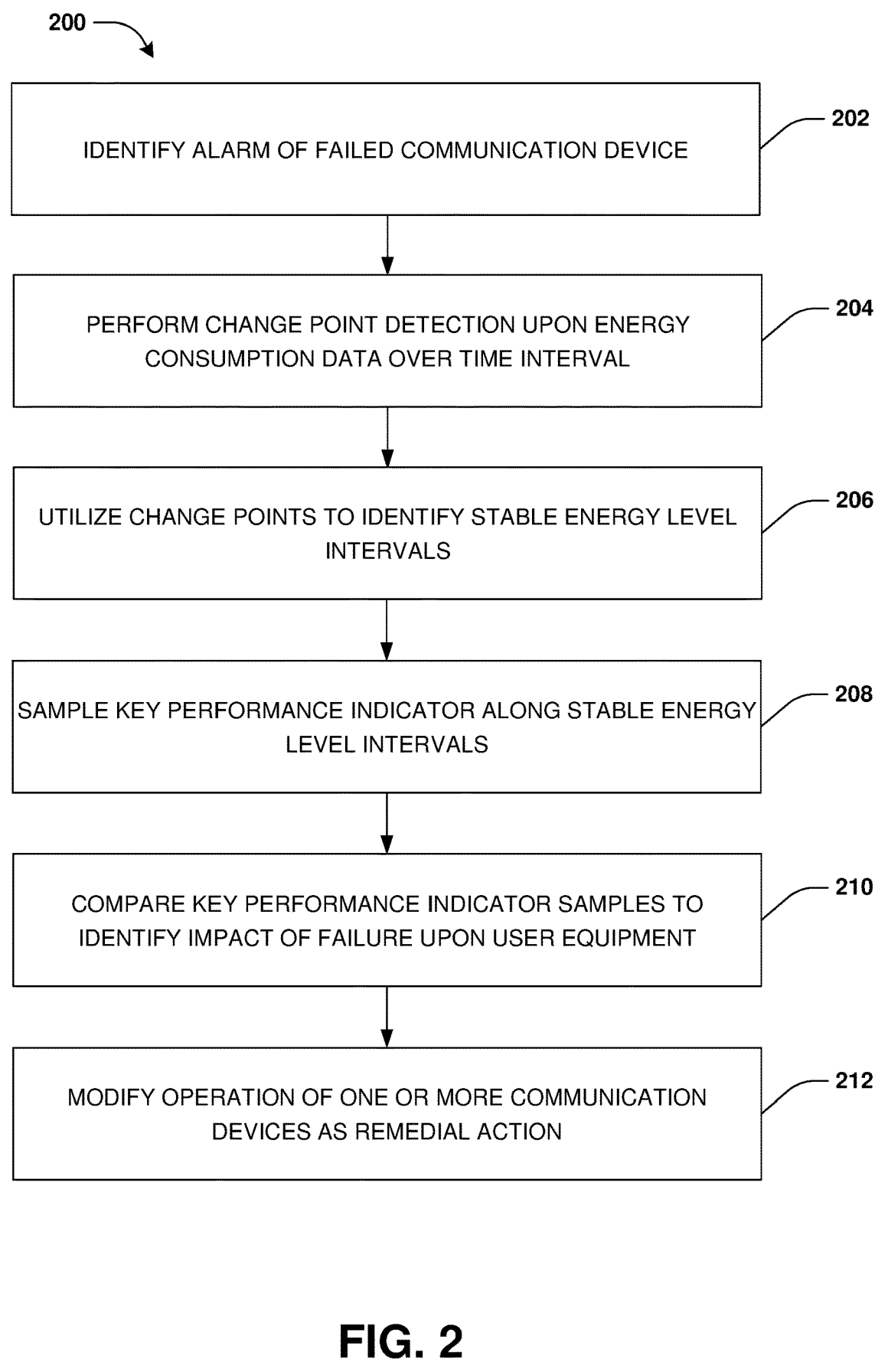

200

IDENTIFY ALARM OF FAILED COMMUNICATION DEVICE ⟋ 202

PERFORM CHANGE POINT DETECTION UPON ENERGY CONSUMPTION DATA OVER TIME INTERVAL ⟋ 204

UTILIZE CHANGE POINTS TO IDENTIFY STABLE ENERGY LEVEL INTERVALS ⟋ 206

SAMPLE KEY PERFORMANCE INDICATOR ALONG STABLE ENERGY LEVEL INTERVALS ⟋ 208

COMPARE KEY PERFORMANCE INDICATOR SAMPLES TO IDENTIFY IMPACT OF FAILURE UPON USER EQUIPMENT ⟋ 210

MODIFY OPERATION OF ONE OR MORE COMMUNICATION DEVICES AS REMEDIAL ACTION ⟋ 212

Figure 4:
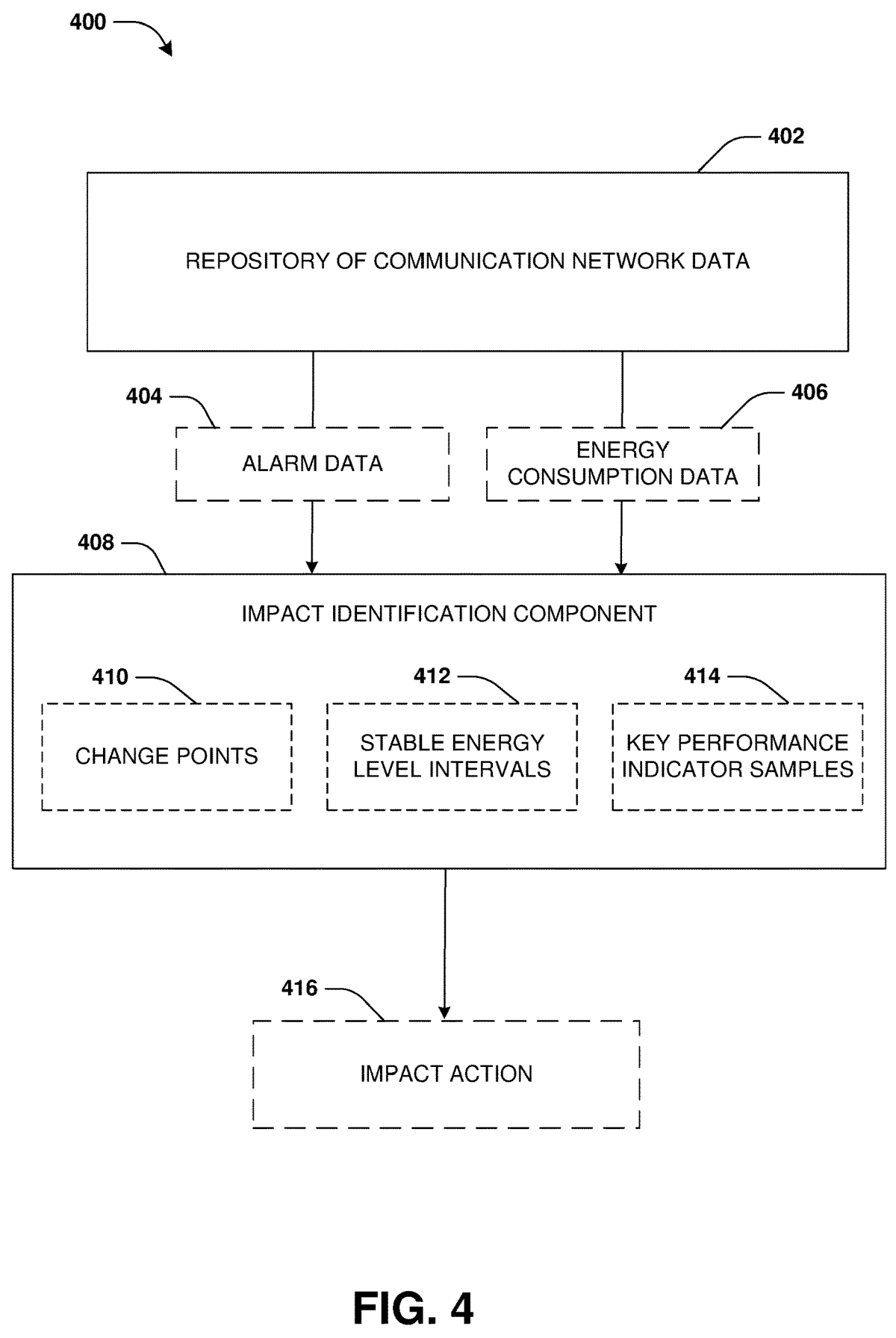

REPOSITORY OF COMMUNICATION NETWORK DATA

404

ALARM DATA

406

ENERGY CONSUMPTION DATA

408

IMPACT IDENTIFICATION COMPONENT

410

CHANGE POINTS

412

STABLE ENERGY LEVEL INTERVALS

414

KEY PERFORMANCE INDICATOR SAMPLES

416

IMPACT ACTION

REAL-TIME ALARM

504

ENERGY
CONSUMPTION DATA

506

IMPACT IDENTIFICATION COMPONENT

510

CHANGE POINTS

512

STABLE ENERGY
LEVEL INTERVALS

514

KEY PERFORMANCE
INDICATOR SAMPLES

MACHINE LEARNING MODEL

516

518

COMMAND TO MODIFY OPERATION OF
COMMUNICATION NETWORK

USER EQUIPMENT IMPACT ESTIMATION AND REMEDIATION

BACKGROUND

A communication network includes a variety of different communication devices that provide user equipment such as cellular phones and other mobile devices with connectivity over the communication network. If a communication device of the communication network fails such as a radio/base station failure, then the operation of user equipment communicating through the failed communication device will be negatively impacted. A user equipment device may experience degraded performance, increased latency, and may be forced to connect to a different radio.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 2 is a flow chart illustrating an example method for estimating the impact upon user equipment from a failure within a communication network, in accordance with an embodiment of the present technology;

FIG. 4 is a diagram illustrating an example of a system for offline estimation of the impact upon user equipment from a failure within a communication network, in accordance with an embodiment of the present technology;

DETAILED DESCRIPTION OF EXAMPLE EMBODIMENTS

Figure 1A:
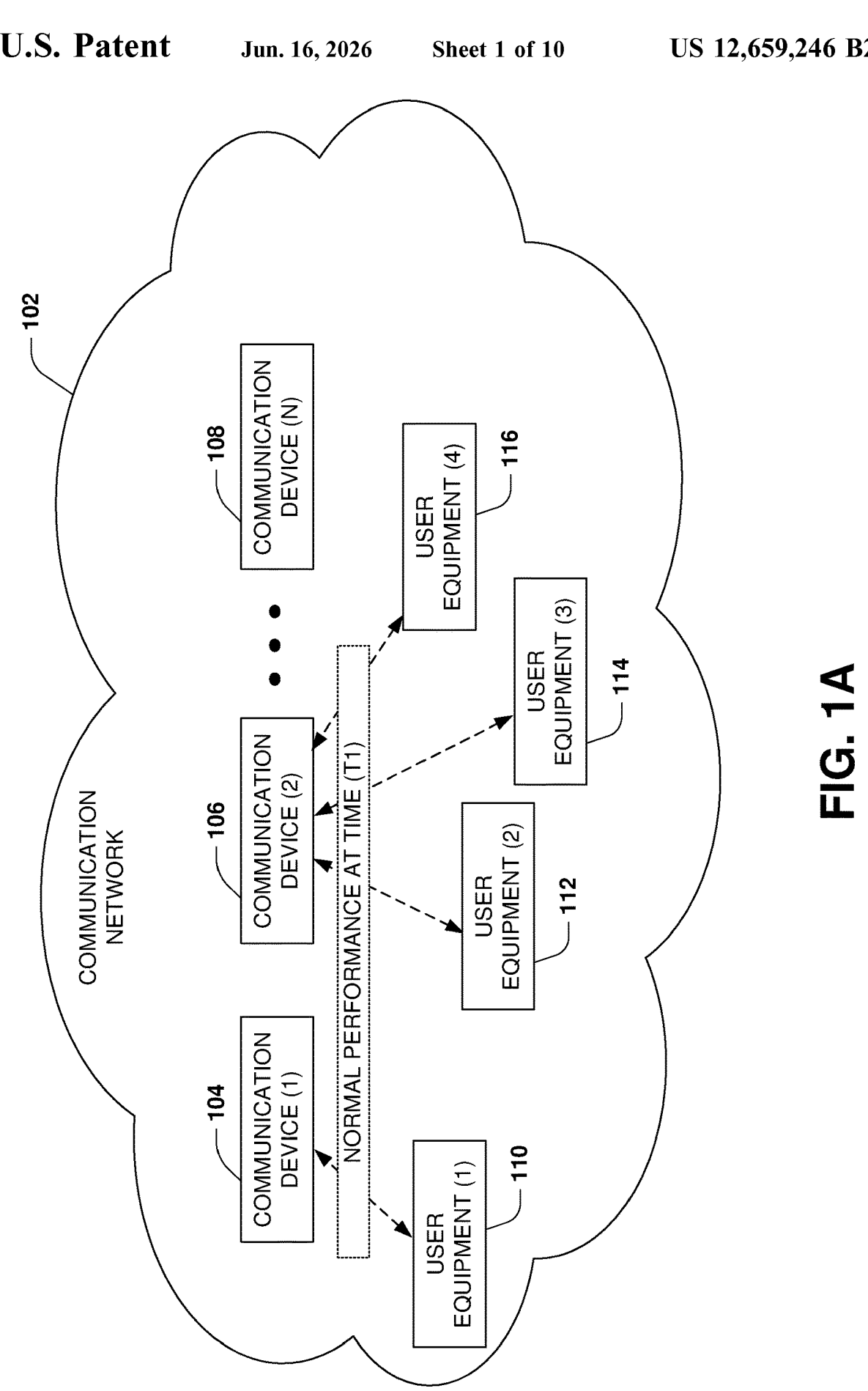
FIG. 1A is a diagram illustrating an example of a communication network, in accordance with an embodiment of the present technology.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof. The following provides a discussion of some types of computing scenarios in which the disclosed subject matter may be utilized and/or implemented.

When there is a failure within a communication network such as a communication device failure (e.g., a radio failure within a wireless network), user equipment (UE) connected to the communication device may experience degraded service and/or disconnections before, during, and/or after the failure. When the communication device fails, an alarm is generated. The alarm includes an alarm timestamp of when the failure occurred, a base station identifier (e.g., an eNodeB identifier), a sector identifier, and/or a radio identifier. Unfortunately, the information within the alarm may not be accurate and/or comprehensive, which makes it difficult to accurately determine which radio failures resulted in user service degradation, when the degradation started, and the effect of the degradation (e.g., which extend service is degraded). For example, service degradation may start prior to the alarm, and thus there is not a direct correlation of the alarm to the service degradation. In order to identify the impact upon user equipment, extensive and time-consuming manual analysis of key performance indicator time series data is required. Visually inspecting and analyzing the key performance indicator time series data is time consuming and does not scale to large communication networks.

In order to address the deficiencies of manually and visually analyzing key performance indicator time series data, the techniques provided herein are capable of accurately estimating the impact of failures upon user equipment in a scalable manner. Instead of merely taking samples of key performance indicators around the time of the alarm which can give incorrect insight into how the failure impacted UE, this innovation employs change point detection (e.g., using machine learning and/or time series analysis) to identify change points and stable energy level intervals between change points. Key performance indicators along the stable energy level intervals are sampled and used to more accurately identify the impact of the failure upon the UE. That is, differences between key performance indicators along a stable energy level interval before a change point (a significant change in energy consumption) and key performance indicators along a stable energy level interval after the change point will provide an accurate view of how the failure impacted the UE. Once the impact has been accurately identified using the key performance indicators sampled along the stable energy level intervals between change points, various remedial actions can be taken. The impact upon UE can be identified offline, or can be performed in real-time in response to alarms and failures so that operation of the communication network can be modified to react to the failures and improve the operation and reduce service degradation experienced by the user equipment.

FIG. 1A is a diagram illustrating an example of a communication network 102. The communication network 102 includes various communication devices, such as radios, base stations, and/or other equipment used to provide UE (e.g., cellular devices such as smart phones, mobile devices, and other wireless devices) with communication capabilities over the communication network 102. For example, the communication network 102 includes a first communication device 104, a second communication device 106, and/or other communication devices such as a communication device (N) 108. First UE 110 may be connected to the first communication device 104 (e.g., a radio/base station), and second UE 112, third UE 114, and fourth UE 116 may be connected to the second communication device 106 (e.g., a different radio/base station). As illustrated by FIG. 1A, the first UE 110, the second UE 112, the third UE 114, and the fourth UE 116 are experiencing normal/expected performance at time (T1), such as where accessibility, retainability, mobility, integrity, availability, utilization, and/or other key performance indicators are within expected ranges.

Figure 1B:
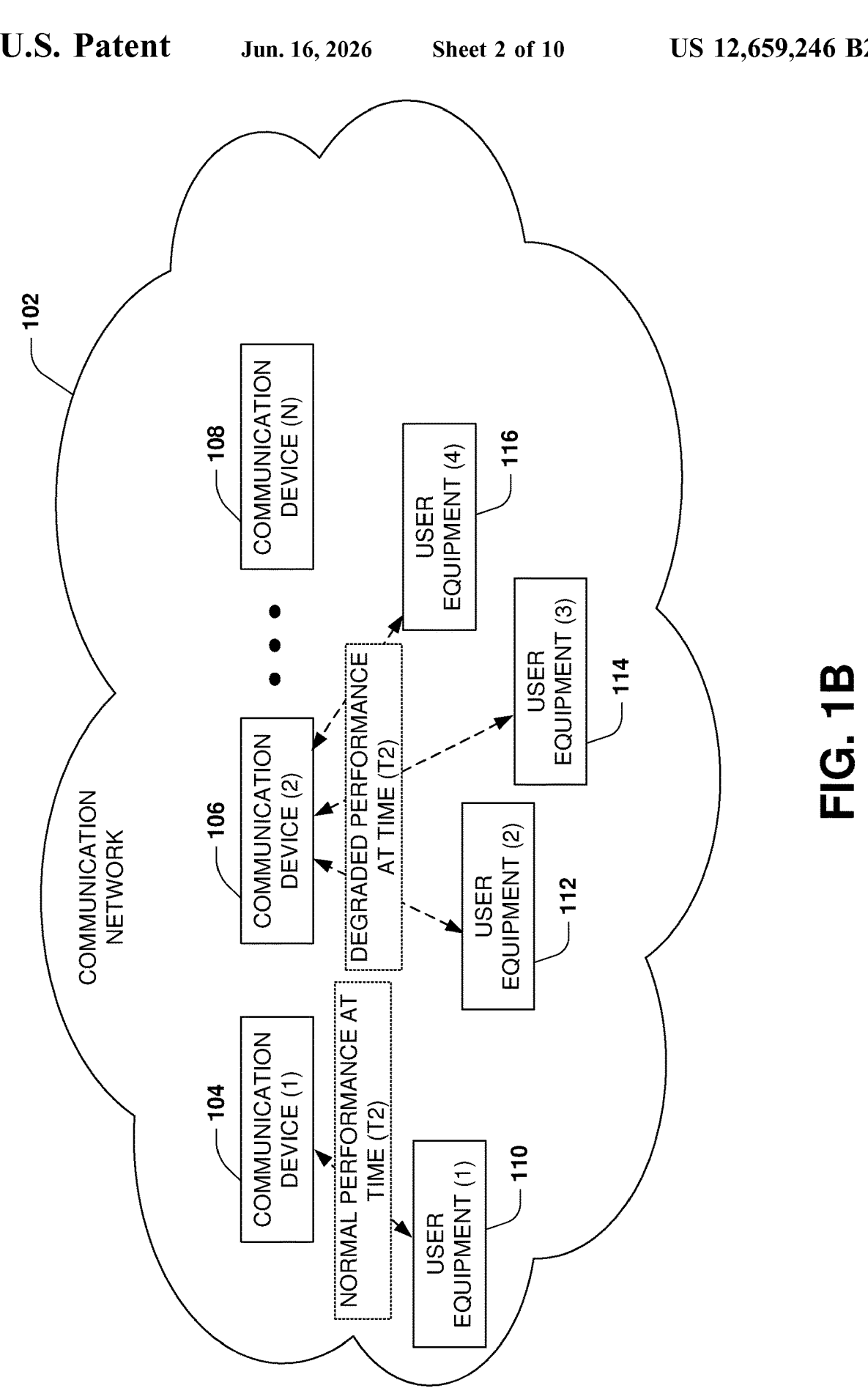
FIG. 1B is a diagram illustrating an example of a communication network where user equipment starts to experience degraded performance.

At time (T2), the first UE 110, connected to the first communication device 104, may still be experiencing normal/expected performance without service degradation, as illustrated by FIG. 1B. However, the second UE 112, the third UE 114, and the fourth UE 116, connected to the second communication device 106, may start to experience degraded performance at time (T2). The degraded performance may be caused by various factors including network element degradation or failure, such as the second communication device 106 operating in a degraded state.

Figure 1C:
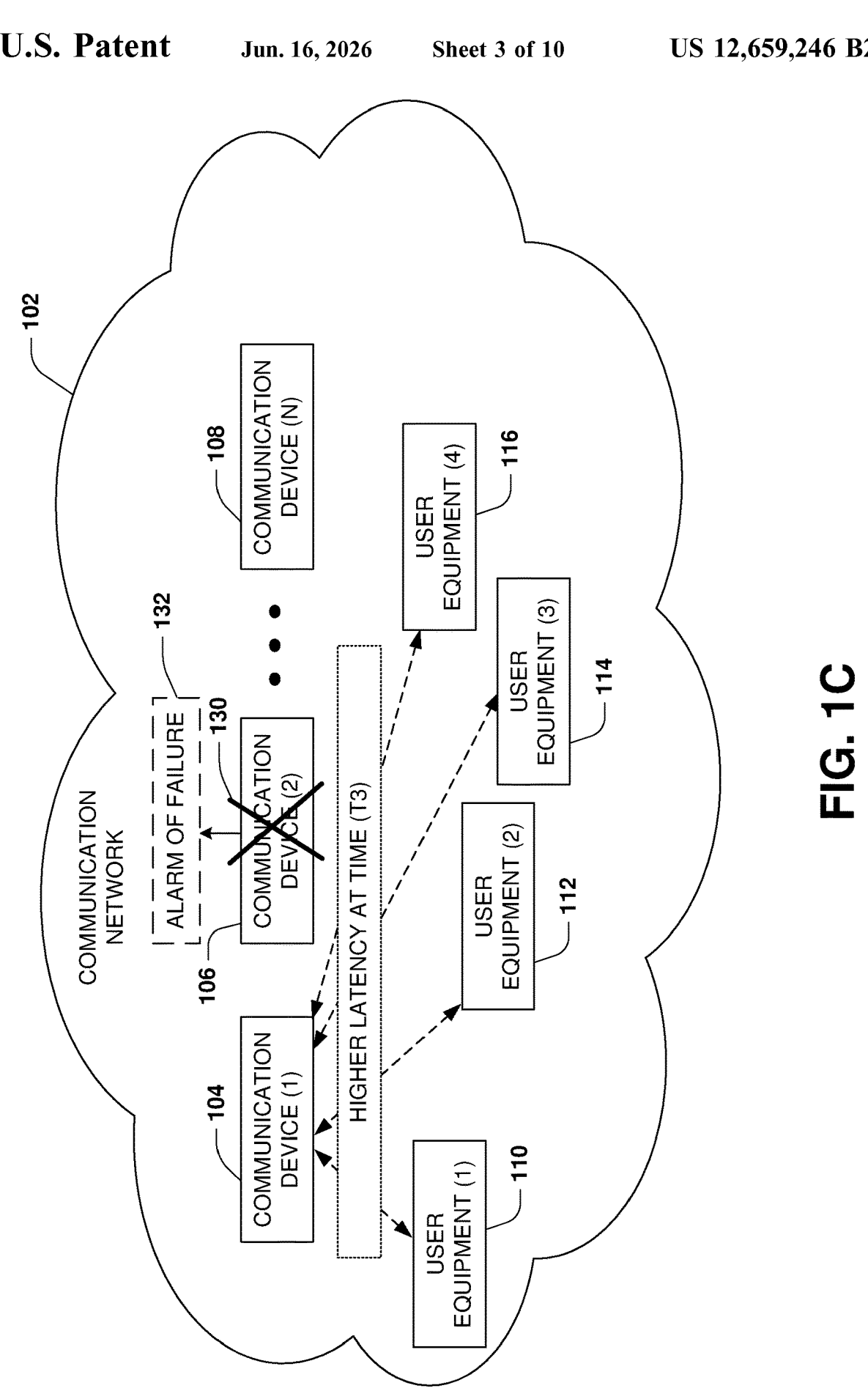
FIG. 1C is a diagram illustrating an example of a communication network when a communication device fails and an alarm is generated.

At time (T3), the second communication device 106 may fail 130, and an alarm 132 is generated based upon the failure 130, as illustrated by FIG. 1C. The second UE 112, the third UE 114, and the fourth UE 116 may connect to the first communication device 104, which may cause the first communication device 104 to become overburdened (overloaded). Because the first communication device 104 is overburdened, the UE connected to the first communication device 104 experience higher latency and lower performance.

Without the techniques described herein, it is difficult to correlate the alarm 132 at time (T3) with the degraded performance experienced by UE at time (T2). Also, it is difficult to correlate the alarm 132 with the degraded performance experienced by UE connected to the first communication device 104 after the failure 130. The ability to accurately identify the impact of the failure 130 upon UE is further described in relation to FIGS. 2-5.

FIG. 2 is a flow chart illustrating an example method 200 for estimating the impact upon UE from a failure within a communication network. During operation 202 of method 200, an alarm indicating a failure of a failed communication device within a communication network is identified. If offline processing is being performed to estimate the impact of the failure upon UE, then the alarm may be identified within a repository such as within an alarm database. If real-time processing is being performed, then the alarm may be received in real-time as the alarm is being generated.

During operation 204 of method 200, change point detection is performed upon energy consumption data over a time interval that includes a timestamp of the alarm. The alarm timestamp corresponds to a time at which the alarm is generated. The energy consumption data may relate to energy consumption of UE connected to the communication network. The change point detection is performed upon the energy consumption data to identify change points relating to threshold changes in energy consumption by the UE (e.g., an energy consumption change greater than 10 or any other value). That is, the change point detection compares differences in energy consumption levels from one energy consumption measurement to the next energy consumption measurement. If the differences exceed a threshold, then a change point is detected. Otherwise, no change point is detected between the energy consumption measurements. The energy consumption data may include time series energy consumption measurements upon which the change point detection is performed.

A change point may occur before the alarm timestamp such as where UE is experiencing degraded performance before the alarm was generated. A change point may occur after the alarm timestamp such as where UE is experiencing degraded performance after the alarm was generated. A change point may occur around when the alarm was created. In some embodiments, when a radio goes out of service, then energy consumption may drop close to zero. However, some radio failures do not cause energy consumption to go to zero.

During operation 206 of method 200, the change points are utilized to identify stable energy level intervals. In some embodiments, a stable energy level interval is a time interval that occurs between a first change point and a second change point. In some embodiments, a first stable energy level interval occurs before a change point and a second stable energy level interval occurs after the change point. A stable energy level interval is identified as an interval between two change points where there is less than a threshold deviation of energy consumption during the interval (e.g., changes in energy consumption less than 10 or any other value). Embodiments of change points and stable energy level intervals will be subsequently described in relation to FIG. 3.

During operation 208 of method 200, key performance indicators are sampled along the stable energy level intervals as indicator samples that will be compared to identify an impact of the failure upon the UE. A variety of different key performance indicators may be sampled, such as a bearer setup failure percentage indicator, a bearer drop percentage indicator, a call drop including handover indicator, a handover failure percentage indicator, a UE downlink throughput indicator, a UE throughput indicator, etc. In some embodiments, the key performance indicators may relate to accessibility of whether a requested service can be accessed by a UE device, retainability of the UE device being able to access the service, mobility of the UE device being able to move while still retaining access to the service, integrity relating to throughput and latency, availability of the communication network, and utilization relating to resource and network capacity.

In some embodiments, the key performance indicators are sampled during specific time periods where there is a threshold amount of UE utilization of the communication network (e.g., "busy hours" such as from 11 am to 4 pm instead of from midnight to 5 am). In some embodiments, the key performance indicators are sampled for different bands supported by the failed communication device for multiple sectors. In some embodiments, the key performance indicators are sampled for an adjacent band not supported by the failed communication device but supported by a different communication device that could be impacted (overburdened/overloaded) from UE disconnecting from the failed communication device and connecting to the different communication device. Key performance indicators may be sampled for different bands because a radio failure can result in service degradation in one or more bands of a same sector, service degradation in multiple bands of multiple sectors of a same eNodeB, and/or service degradation in multiple bands of multiple sectors of multiple eNodeBs in proximity of an impacted eNodeB.

During operation 210 of method 200, the key performance indicator samples are compared to identify the impact of the failure upon UE connected to the communication device. The larger the change/drop in a key performance indicator from one stable energy level interval to another stable energy level interval (e.g., the larger the change before and after the alarm, before and after a change point, etc.), the greater the impact of the failure upon UE. In some embodiments, key performance indicator samples are compared on a per band basis. For a particular band, a first average of sample key performance indicator points along a first stable energy level interval (e.g., a stable energy level interval before a change point) is calculated. A second average of sample key performance indicator points along a second stable energy level interval (e.g., a stable energy level interval after the change point) is calculated. The impact is determined based upon a difference between the first average and the second average such as where the difference exceeds a threshold.

In response to the impact exceeding a degradation threshold, operation of one or more communication devices within the communication network may be modified in order to reduce performance degradation and improve the operation of UE connected to the communication network, during operation 212 of method 200. In some embodiments, a command may be transmitted to a communication device to modify operational parameters of the communication device such as to compensate for the failed communication device. In some embodiments, the command may be transmitted in real-time in response to receiving the alarm of the failure. In particular, a machine learning model may be utilized to generate a predicted impact of the failure upon UE (e.g., a future impact of the failure) or utilized to predict a failure based upon current energy consumption data input into the machine learning model, which is used to generate the command in real-time for modifying operation of the communication network in response to the failure (e.g., modify a radio frequency being used for improved signal strength, increase or reduce power consumption, etc.). The command is executed in order to mitigate a negative performance impact of the failure upon UE. In this way, various commands or actions may be executed as remedial actions.

Figure 3:
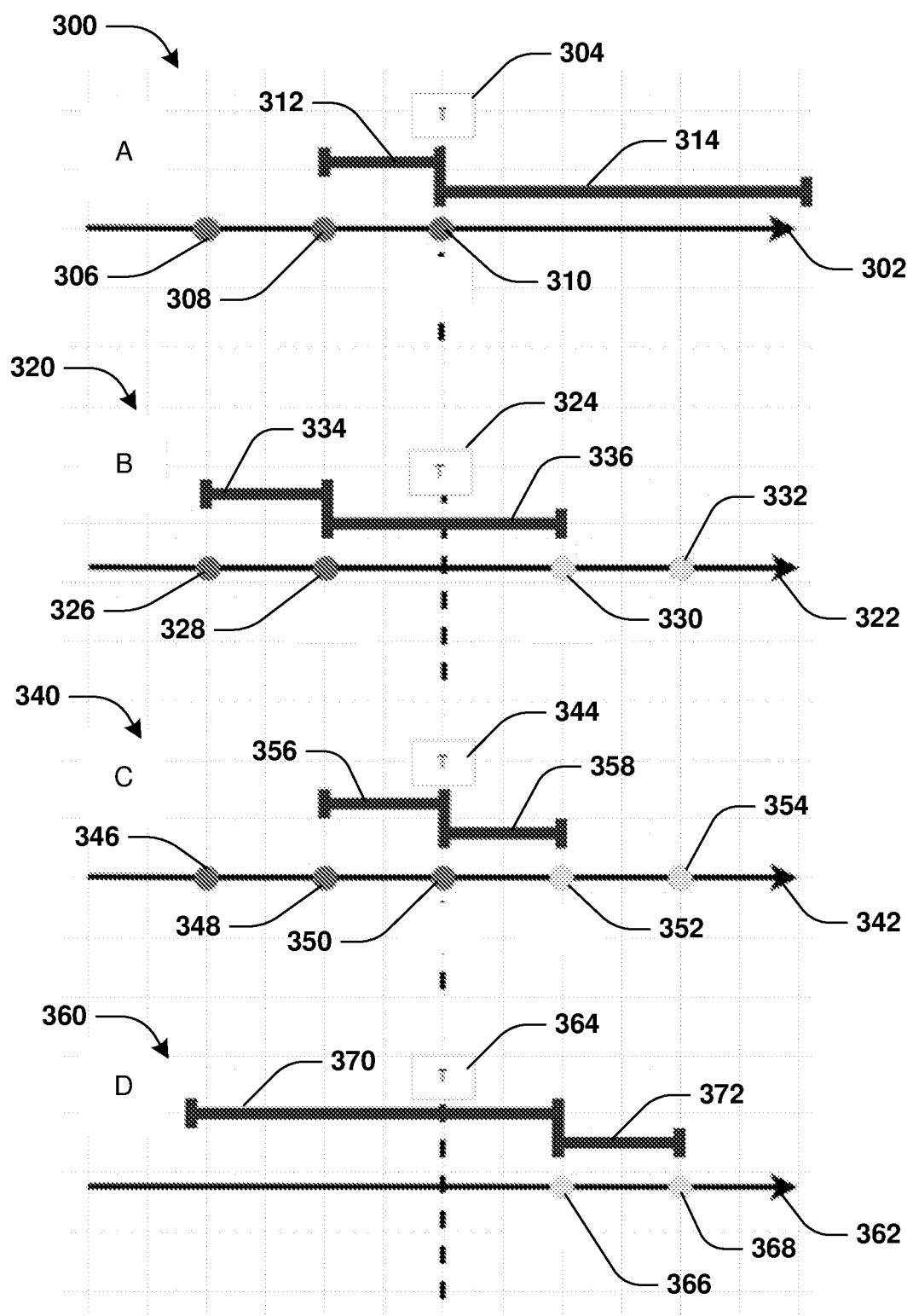
FIG. 3 is an illustration of charts relating to estimating the impact upon user equipment from a failure within a communication network, in accordance with an embodiment of the present technology.

FIG. 3 is an illustration of charts relating to estimating the impact upon UE from a failure within a communication network. A first chart 300 has a time axis 302 along which change points and stable energy level intervals are plotted. At time (T) 304, an alarm is received. A first change point 306 and a second change point 308 are identified before the time (T) 304 of the alarm, and a third change point 310 is identified at/around the time (T) 304 of the alarm. The change points relate to where there is a threshold change in energy consumption by UE. A first stable energy level interval 312 is identified before the time (T) 304 of the alarm and is between the second change point 308 and the third change point 310. A stable energy level interval such as the first stable energy level interval 312 is identified as including consecutive energy consumption measurements (within time series energy consumption data) between two change points and/or a series of consecutive energy consumption measurements where there is less than a threshold change in energy consumption from one energy consumption measurement to the next energy consumption measurement (e.g., starting at a change point, energy consumption measurements extending in time from the change point are included within a stable energy level until a next energy consumption measurement is more than a threshold different such as 5 from a prior energy consumption measurement). In some embodiments, a stable energy level interval is an interval between two change points where less than a threshold deviation of energy consumption occurs along the interval. A second stable energy level interval 314 is identified after the time (T) 304 of the alarm and starts at the third change point 310. Key performance indicators may be sampled along the first stable energy level interval 312 and second stable energy level interval 314, and are compared to identify an impact of the failure upon UE.

A second chart 320 has a time axis 322 along which change points and stable energy level intervals are plotted. At time (T) 324, an alarm is received. A first change point 326 and a second change point 328 are identified before the time (T) 324 of the alarm, and a third change point 330 and a fourth change point 332 are identified after the time (T) 324 of the alarm. The change points relate to where there is a threshold change in energy consumption by UE. A first stable energy level interval 334 is identified before the time (T) 324 of the alarm and is between the first change point 326 and the second change point 328. A second stable energy level interval 336 is identified during the time (T) 324 of the alarm and is between the second change point 328 and the third change point 330. Key performance indicators may be sampled along the first stable energy level interval 334 and second stable energy level interval 336, and are compared to identify an impact of the failure upon UE.

A third chart 340 has a time axis 342 along which change points and stable energy level intervals are plotted. At time (T) 344, an alarm is received. A first change point 346 and a second change point 348 are identified before the time (T) 344 of the alarm, a third change point 350 is identified at/around the time (T) 344 of the alarm, and a fourth change point 352 and a fifth change point 354 are identified after the time (T) 344 of the alarm. The change points relate to where there is a threshold change in energy consumption by UE. A first stable energy level interval 356 is identified before the time (T) 344 of the alarm and is between the second change point 348 and the third change point 350. A second stable energy level interval 358 is identified after the time (T) 344 of the alarm and is between the third change point 350 and the fourth change point 352. Key performance indicators may be sampled along the first stable energy level interval 356 and second stable energy level interval 358, and are compared to identify an impact of the failure upon UE.

A fourth chart 360 has a time axis 362 along which change points and stable energy level intervals are plotted. At time (T) 364, an alarm is received. A first change point 366 and a second change point 368 are identified after the time (T) 364 of the alarm. The change points relate to where there is a threshold change in energy consumption by UE. A first stable energy level interval 370 is identified during the time (T) 344 of the alarm and ends at the first change point 366. A second stable energy level interval 372 is identified after the time (T) 344 of the alarm and is between the first change point 366 and the second change point 368. Key performance indicators may be sampled along the first stable energy level interval 370 and second stable energy level interval 372, and are compared to identify an impact of the failure upon UE.

FIG. 4 is a diagram illustrating an example of a system 400 for estimating the impact upon UE from a failure within a communication network. In some embodiments, an impact identification component 408 (e.g., hardware and/or software of a computer) performs an offline evaluation of alarm data 404 and energy consumption data 406 stored within a repository of communication network data 402 such as a database. The impact identification component 408 may identify an alarm, from the alarm data, that corresponds to a failure of a communication device that failed within the communication network at a point in time corresponding to an alarm timestamp. The impact identification component 408 identifies energy consumption data 406 that corresponds to a time interval that includes an alarm timestamp of the alarm. The impact identification component 408 detects change points 410 from the energy consumption data 406 as points in time where there is a threshold change in energy consumption by UE.

Once the change points 410 are detected, the impact identification component 408 identifies stable energy level intervals 412 as intervals between change points where there is less than a threshold deviation of energy consumption along the intervals. The impact identification component 408 samples key performance indicators along the stable energy level intervals 412 to create key performance indicator samples 414 that are compared to identify an impact of the failure upon UE. If the impact exceeds a degradation threshold (e.g., UE experienced a threshold amount of service degradation as identified by the comparison of the key performance indicator samples 414), then an impact action 416 may be executed. The impact action 416 may be a computer generated command that is transmitted over the communication network to a communication device for changing operational parameters used by the communication device (e.g., modify a radio frequency being used for improved signal strength, increase or reduce power consumption, instruct a UE or communication device to switch the UE from connecting to one base station to a different base station, instruct a UE or communication device to perform a handoff, transmit a notification of a computing device of a technician to perform a repair, shut down a communication device, restart a communication device, initialize or turn on a communication device, perform a failover from a failed communication device to a surviving communication device, etc.). The impact action 416 is executed in order to reduce any subsequent service degradation from the failure or other future failures.

Figure 5:
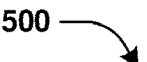
FIG. 5 is a diagram illustrating an example of a system for real-time estimation of the impact upon user equipment from a failure within a communication network, in accordance with an embodiment of the present technology.

FIG. 5 is a diagram illustrating an example of a system 500 for estimating the impact upon UE from a failure within a communication network. In some embodiments, an impact identification component 506 (e.g., hardware and/or software of a computer) performs an online and real-time evaluation of an alarm 502 in order to select and execute a remedial action. The remedial action is executed in order to reduce a current impact of the failure upon UE. The alarm 502 corresponds to a failure of a communication device that failed within the communication network. The impact identification component 506 implements a machine learning module 516 that utilizes energy consumption data 504, current and/or historic change points 510, current and/or historic stable energy level intervals 512, and current and/or historic key performance indicator samples 514 in order to generate a predicted impact of the failure upon UE. The predicted impact may be used to generate a remedial action that is executed in order to reduce the current impact of the failure upon UE. In some embodiments, the remedial action may be a computer generated command 518 that is transmitted over the communication network to a communication device for changing operational parameters used by the communication device in order to reduce any subsequent service degradation from the failure (e.g., modify a radio frequency being used for improved signal strength, increase or reduce power consumption, instruct a UE or communication device to switch the UE from connecting to one base station to a different base station, instruct a UE or communication device to perform a handoff, transmit a notification of a computing device of a technician to perform a repair, shut down a communication device, restart a communication device, initialize or turn on a communication device, perform a failover from a failed communication device to a surviving communication device, generate and provide instructions to replace a failed radio, generate and provide instructions to repair a failed radio, modify settings of a load balancer or a load balancing algorithm so that when a radio goes out of service then other sectors do not become overburdened by other UEs coming from the impacted sector/radio to a particular sector, etc.).

According to some embodiments, a method may be provided. The method includes identifying an alarm of a failure of a communication device within a communication network; evaluating energy consumption data over a time interval that includes an alarm timestamp of the alarm to identify change points relating to threshold changes in energy consumption of the communication device; utilizing the change points to identify stable energy level intervals, wherein a first stable energy level interval occurs before a change point and a second stable energy level interval occurs after the change point; sampling a key performance indicator along the first stable energy level interval as a first key performance indicator sample and along the second stable energy level interval as a second key performance indicator sample; comparing the first key performance indicator sample and the second key performance indicator sample to identify an impact of the failure upon user equipment connected to the communication network; and performing a remedial action to modify operation of the communication network.

According to some embodiments, the method includes in response to the impact exceeding a degradation threshold, modifying operation of one or more communication devices within the communication network.

According to some embodiments, the method includes utilizing a machine learning model to evaluate the alarm in real-time in response to the alarm being generated, wherein the machine learning model generates a predicted impact of the failure upon the user equipment; and modifying operation of one or more communication devices within the communication network based upon the predicted impact.

According to some embodiments, the method includes transmitting a command to a device within the communication network to modify a radio frequency being used or to increase or reduce power consumption.

According to some embodiments, the first change point and the second change point occur after the alarm timestamp.

According to some embodiments, the first change point and the second change point occur before the alarm timestamp.

According to some embodiments, the first change point occurs before the alarm timestamp and the second change point occur after the alarm timestamp.

According to some embodiments, the method includes sampling a plurality of key performance indicators for different bands supported by the communication device and for multiple sectors to create a plurality of key performance indicator samples; and utilizing the plurality of key performance indicator samples to identify the impact of the failure.

According to some embodiments, the method includes sampling a plurality of key performance indicators for an adjacent band not supported by the communication device to create a plurality of key performance indicator samples; and utilizing the plurality of key performance indicator samples to identify the impact of the failure.

According to some embodiments, the method includes for a band supported by the communication device: calculating a first average of sample key performance indicator points along the first stable energy level interval; calculating a second average of sample key performance indicator points along the seconds stable energy level interval: and determining whether a difference between the first average and the second average exceeds a threshold.

According to some embodiments, the method includes identifying time periods where there is a threshold amount of user equipment utilization of the communication network; and sampling the key performance indicators during the time periods.

According to some embodiments, the method includes sampling a plurality of key performance indicators for identifying the impact, wherein the plurality of key performance indicators comprise at least one of a bearer setup failure percentage indicator, a bearer drop percentage indicator, a call drop including handover indicator, a handover failure percentage indicator, a user equipment downlink throughput indicator, or a user equipment throughput indicator.

According to some embodiments, a system comprising one or more processors configured for executing the instructions to perform operations, is provided. The operations include in response to receiving an alarm of a failure of a communication device within a communication network, evaluating energy consumption data over a time interval that includes an alarm timestamp of the alarm to identify change points relating to threshold changes in energy consumption; utilizing the change points to identify stable energy level intervals, wherein a first stable energy level interval occurs before a change point and a second stable energy level interval occurs after the change point; sampling a key performance indicator along the first stable energy level interval as a first key performance indicator sample and along the second stable energy level interval as a second key performance indicator sample; comparing the first key performance indicator sample and the second key performance indicator sample to identify an impact of the failure upon user equipment connected to the communication network; and modifying operation of the communication network based upon the failure.

According to some embodiments, the operations includes in response to the impact exceeding a degradation threshold, modifying operation of one or more communication devices within the communication network.

According to some embodiments, the operations includes utilizing a machine learning model to evaluate the alarm in real-time in response to the alarm being generated, wherein the machine learning model generates a predicted impact of the failure upon the user equipment; and modifying operation of one or more communication devices within the communication network based upon the predicted impact.

According to some embodiments, the operations includes identifying a stable energy level interval as an interval between a first change point and a second change point where less than a threshold deviation of energy consumption occurs during the interval.

According to some embodiments, a non-transitory computer-readable medium storing instructions that when executed facilitate performance of operations, is provided. The operations include identifying an alarm of a failure of a communication device within a communication network; evaluating energy consumption data over a time interval that includes an alarm timestamp of the alarm to identify change points relating to threshold changes in energy consumption; utilizing the change points to identify stable energy level intervals, wherein a first stable energy level interval occurs before a change point and a second stable energy level interval occurs after the change point; sampling a key performance indicator along the first stable energy level interval as a first key performance indicator sample and along the second stable energy level interval as a second key performance indicator sample; and comparing, utilizing a machine learning model, the first key performance indicator sample and the second key performance indicator sample to generate a predicted impact of the failure upon user equipment connected to the communication network.

According to some embodiments, the operations includes sampling a plurality of key performance indicators for different bands supported by the communication device and for multiple sectors to create a plurality of key performance indicator samples; and utilizing the plurality of key performance indicator samples to identify the impact of the failure.

According to some embodiments, the operations includes sampling a plurality of key performance indicators for an adjacent band not supported by the communication device to create a plurality of key performance indicator samples; and utilizing the plurality of key performance indicator samples to identify the impact of the failure.

According to some embodiments, the operations includes for a band supported by the communication device: calculating a first average of sample key performance indicator points along the first stable energy level interval; calculating a second average of sample key performance indicator points along the seconds stable energy level interval: and determining whether a difference between the first average and the second average exceeds a threshold.

Figure 6:
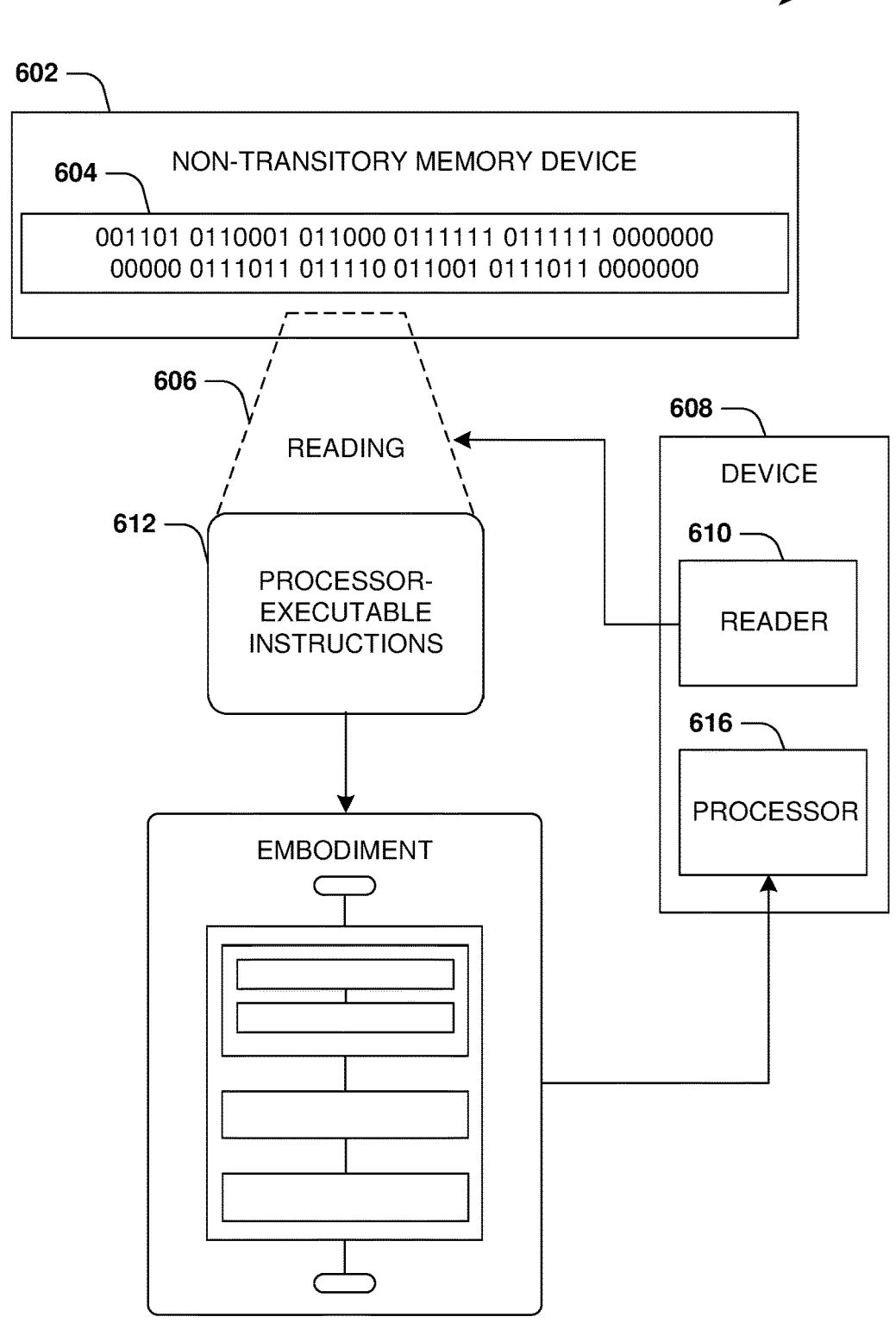
FIG. 6 is an illustration of example networks that may utilize and/or implement at least a portion of the techniques presented herein.

FIG. 6 is an interaction diagram of a scenario 600 illustrating a service 602 provided by a set of computers 604 to a set of client devices 610 via various types of transmission mediums. The computers 604 and/or client devices 610 may be capable of transmitting, receiving, processing, and/or storing many types of signals, such as in memory as physical memory states.

In some embodiments, the computers 604 may be host devices and/or the client device 610 may be devices attempting to communicate with the computer 604 over buses for which device authentication for bus communication is implemented.

The computers 604 of the service 602 may be communicatively coupled together, such as for exchange of communications using a transmission medium 606. The transmission medium 606 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 602.

Likewise, the transmission medium 606 may comprise one or more sub-networks, such as may employ different architectures, may be compliant or compatible with differing protocols and/or may interoperate within the transmission medium 606. Additionally, various types of transmission medium 606 may be interconnected (e.g., a router may provide a link between otherwise separate and independent transmission medium 606).

In scenario 600 of FIG. 6, the transmission medium 606 of the service 602 is connected to a transmission medium 608 that allows the service 602 to exchange data with other services 602 and/or client devices 610. The transmission medium 608 may encompass various combinations of devices with varying levels of distribution and exposure, such as a public wide-area network and/or a private network (e.g., a virtual private network (VPN) of a distributed enterprise).

In the scenario 600 of FIG. 6, the service 602 may be accessed via the transmission medium 608 by a user 612 of one or more client devices 610, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 610 may communicate with the service 602 via various communicative couplings to the transmission medium 608. As a first such example, one or more client devices 610 may comprise a cellular communicator and may communicate with the service 602 by connecting to the transmission medium 608 via a transmission medium 609 provided by a cellular provider. As a second such example, one or more client devices 610 may communicate with the service 602 by connecting to the transmission medium 608 via a transmission medium 609 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the computers 604 and the client devices 610 may communicate over various types of transmission mediums.

Figure 7:
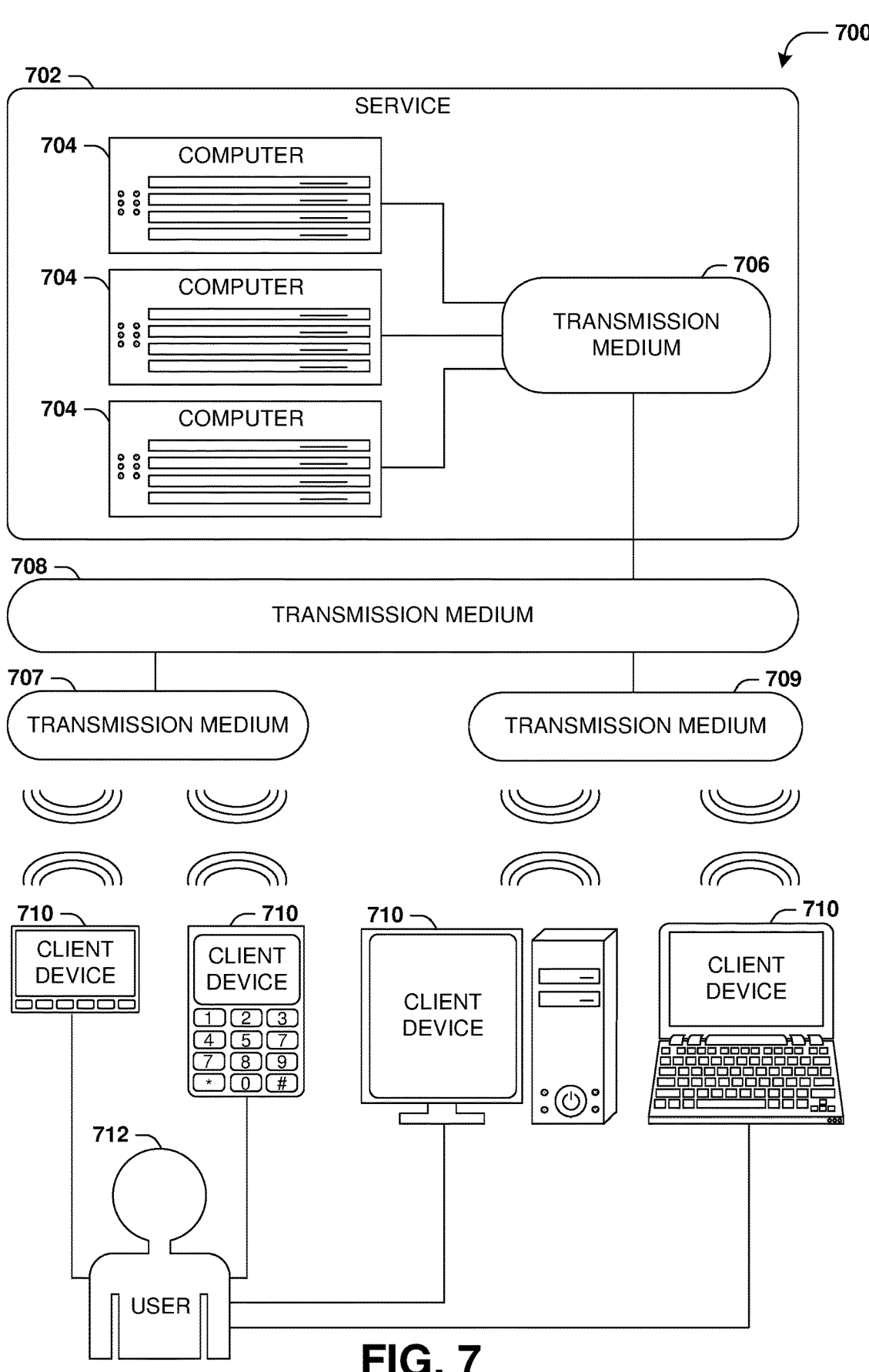
FIG. 7 is an illustration of a scenario involving an example configuration of a computer that may utilize and/or implement at least a portion of the techniques presented herein.

FIG. 7 presents a schematic architecture diagram 700 of a computer 604 that may utilize at least a portion of the techniques provided herein. Such a computer 604 may vary widely in configuration or capabilities, alone or in conjunction with other computers, in order to provide a service such as the service 602.

The computer 604 may comprise one or more processors 710 that process instructions. The one or more processors 710 may optionally include a plurality of cores; one or more coprocessors, such as a mathematics coprocessor or an integrated graphical processing unit (GPU); and/or one or more layers of local cache memory. The computer 604 may comprise memory 702 storing various forms of applications, such as an operating system 704; one or more computer applications 706; and/or various forms of data, such as a database 708 or a file system. The computer 604 may comprise a variety of peripheral components, such as a wired and/or wireless network adapter 714 connectible to a local area network and/or wide area network; one or more storage components 716, such as a hard disk drive, a solid-state storage device (SSD), a flash memory device, and/or a magnetic and/or optical disk reader.

The computer 604 may comprise a mainboard featuring one or more communication buses 712 that interconnect the processor 710, the memory 702, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 712 may interconnect the computer 604 with at least one other computer. Other components that may optionally be included with the computer 604 (though not shown in the schematic architecture diagram 700 of FIG. 7) include a display; a display adapter, such as a graphical processing unit (GPU); input peripherals, such as a keyboard and/or mouse; and a flash memory device that may store a basic input/output system (BIOS) routine that facilitates booting the computer 604 to a state of readiness.

The computer 604 may operate in various physical enclosures, such as a desktop or tower, and/or may be integrated with a display as an "all-in-one" device. The computer 604 may be mounted horizontally and/or in a cabinet or rack, and/or may simply comprise an interconnected set of components. The computer 604 may comprise a dedicated and/or shared power supply 718 that supplies and/or regulates power for the other components. The computer 604 may provide power to and/or receive power from another computer and/or other devices. The computer 604 may comprise a shared and/or dedicated climate control unit 720 that regulates climate properties, such as temperature, humidity, and/or airflow. Many such computers 604 may be configured and/or adapted to utilize at least a portion of the techniques presented herein.

Figures 8, 9:
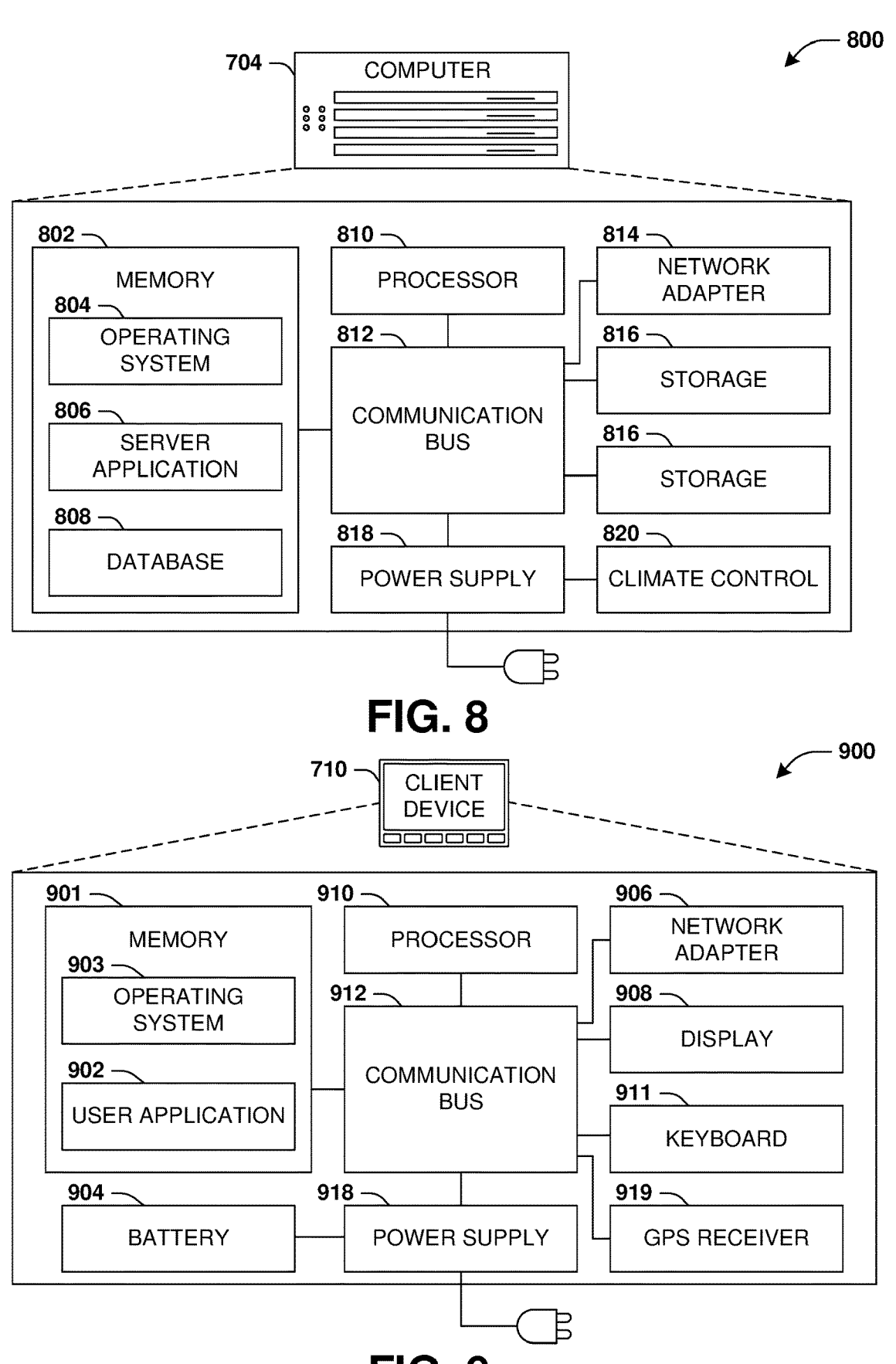
FIG. 8 is an illustration of a scenario involving an example configuration of a client that may utilize and/or implement at least a portion of the techniques presented herein.
FIG. 9 is an illustration of a scenario featuring an example non-transitory machine readable medium in accordance with one or more of the provisions set forth herein.

FIG. 8 presents a schematic architecture diagram 800 of a client device 610 whereupon at least a portion of the techniques presented herein may be implemented. Such a client device 610 may vary widely in configuration or capabilities, in order to provide a variety of functionality to a user such as the user 612. The client device 610 may be provided in a variety of form factors, such as a desktop or tower workstation; an "all-in-one" device integrated with a display 808; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 610 may serve the user in a variety of roles, such as a workstation, kiosk, media player, gaming device, and/or appliance.

The client device 610 may comprise one or more processors 810 that process instructions. The one or more processors 810 may optionally include a plurality of cores; one or more coprocessors, such as a mathematics coprocessor or an integrated graphical processing unit (GPU); and/or one or more layers of local cache memory. The client device 610 may comprise memory 801 storing various forms of applications, such as an operating system 803; one or more user applications 802, such as document applications, media applications, file and/or data access applications, communication applications such as web browsers and/or email clients, utilities, and/or games; and/or drivers for various peripherals. The client device 610 may comprise a variety of peripheral components, such as a wired and/or wireless network adapter 806 connectible to a local area network and/or wide area network; one or more output components, such as a display 808 coupled with a display adapter (optionally including a graphical processing unit (GPU)), a sound adapter coupled with a speaker, and/or a printer; input devices for receiving input from the user, such as a keyboard 811, a mouse, a microphone, a camera, and/or a touch-sensitive component of the display 808; and/or environmental sensors, such as a global positioning system (GPS) receiver 819 that detects the location, velocity, and/or acceleration of the client device 610, a compass, accelerometer, and/or gyroscope that detects a physical orientation of the client device 610. Other components that may optionally be included with the client device 610 (though not shown in the schematic architecture diagram 800 of FIG. 8) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 610 to a state of readiness; and a climate control unit that regulates climate properties, such as temperature, humidity, and airflow.

The client device 610 may comprise a mainboard featuring one or more communication buses 812 that interconnect the processor 810, the memory 801, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 610 may comprise a dedicated and/or shared power supply 818 that supplies and/or regulates power for other components, and/or a battery 804 that stores power for use while the client device 610 is not connected to a power source via the power supply 818. The client device 610 may provide power to and/or receive power from other client devices.

FIG. 9 is an illustration of a scenario 900 involving an example non-transitory machine readable medium 902. The non-transitory machine readable medium 902 may comprise processor-executable instructions 912 that when executed by a processor 916 cause performance (e.g., by the processor 916) of at least some of the provisions herein. The non-transitory machine readable medium 902 may comprise a memory semiconductor (e.g., a semiconductor utilizing static random access memory (SRAM), dynamic random access memory (DRAM), and/or synchronous dynamic random dom access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 902 stores computer-readable data 904 that, when subjected to reading 906 by a reader 910 of a device 908 (e.g., a read head of a hard disk drive, or a read operation invoked on a solid-state storage device), express the processor-executable instructions 912. In some embodiments, the processor-executable instructions 912, when executed cause performance of operations, such as at least some of the example method 200 of FIG. 2, for example. In some embodiments, the processor-executable instructions 912 are configured to cause implementation of a system, such as at least some of the example system 400 of FIG. 4 and/or at least some of the example system 500 of FIG. 5.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

What is claimed:

1. A method, comprising:
identifying an alarm of a failure of a communication device within a communication network;
evaluating energy consumption data, over a time interval, that includes an alarm timestamp of the alarm to identify change points in energy consumption of the communication device, wherein a change point corresponds to a difference in energy consumption levels from one energy consumption measurement to another energy consumption measurement exceeding a threshold;
utilizing the change points to identify stable energy level intervals, wherein a first stable energy level interval occurs before the change point and a second stable energy level interval occurs after the change point;
sampling a key performance indicator along the first stable energy level interval as a first key performance indicator sample;
sampling a key performance indicator along the second stable energy level interval as a second key performance indicator sample;
comparing (i) the first key performance indicator sample associated with the first stable energy level interval and (ii) the second key performance indicator sample associated with the second stable energy level interval to determine an amount of change from the first stable energy level interval to the second stable energy level interval;
determining, based upon the amount of change from the first stable energy level interval to the second stable energy level interval, an impact of the failure upon user equipment connected to the communication network, wherein the impact of the failure is greater if the amount of change is a first amount of change than if the amount of change is a second amount of change less than the first amount of change; and
performing a remedial action to modify operation of the communication network.

2. The method of claim 1, wherein performing the remedial action comprises:
in response to the impact exceeding a degradation threshold, modifying operation of one or more communication devices within the communication network.

3. The method of claim 1, comprising:
utilizing a machine learning model to evaluate the alarm in real-time in response to the alarm being generated, wherein the machine learning model generates a predicted impact of the failure upon the user equipment; and
modifying operation of one or more communication devices within the communication network based upon the predicted impact.

4. The method of claim 1, wherein performing the remedial action comprises:
transmitting a command to a device within the communication network to modify a radio frequency being used or to increase or reduce power consumption.

5. The method of claim 1, wherein a first change point of the change points and a second change point of the change points occur after the alarm timestamp.

6. The method of claim 1, wherein a first change point of the change points and a second change point of the change points occur before the alarm timestamp.

7. The method of claim 1, wherein a first change point of the change points occurs before the alarm timestamp and a second change point of the change points occurs after the alarm timestamp.

8. The method of claim 1, comprising:
sampling a plurality of key performance indicators for different bands supported by the communication device and for multiple sectors to create a plurality of key performance indicator samples; and
utilizing the plurality of key performance indicator samples to identify the impact of the failure.

9. The method of claim 1, comprising:
sampling a plurality of key performance indicators for an adjacent band not supported by the communication device to create a plurality of key performance indicator samples; and
utilizing the plurality of key performance indicator samples to identify the impact of the failure.

10. The method of claim 1, comprising:
for a band supported by the communication device:
calculating a first average of sample key performance indicator points along the first stable energy level interval;
calculating a second average of sample key performance indicator points along the second stable energy level interval; and
determining whether a difference between the first average and the second average exceeds a threshold.

11. The method of claim 1, comprising:
identifying time periods where there is a threshold amount of user equipment utilization of the communication network; and
sampling the key performance indicators during the time periods.

12. The method of claim 1, comprising:
sampling a plurality of key performance indicators for identifying the impact, wherein the plurality of key performance indicators comprise at least one of a bearer setup failure percentage indicator, a bearer drop percentage indicator, a call drop including handover indicator, a handover failure percentage indicator, a user equipment downlink throughput indicator, or a user equipment throughput indicator.

13. A system, comprising:
one or more processors configured for executing instructions to perform operations comprising:
in response to receiving an alarm of a failure of a communication device within a communication network, evaluating energy consumption data, over a time interval, that includes an alarm timestamp of the alarm to identify change points in energy consumption, wherein a change point corresponds to a difference in energy consumption levels from one energy consumption measurement to another energy consumption measurement exceeding a threshold;

utilizing the change points to identify stable energy level intervals, wherein a first stable energy level interval occurs before the change point and a second stable energy level interval occurs after the change point;

sampling a key performance indicator along the first stable energy level interval as a first key performance indicator sample;

sampling a key performance indicator along the second stable energy level interval as a second key performance indicator sample;

comparing (i) the first key performance indicator sample associated with the first stable energy level interval and (ii) the second key performance indicator sample associated with the second stable energy level interval to determine an amount of change from the first stable energy level interval to the second stable energy level interval;

determining, based upon the amount of change from the first stable energy level interval to the second stable energy level interval, an impact of the failure upon user equipment connected to the communication network, wherein the impact of the failure is greater if the amount of change is a first amount of change than if the amount of change is a second amount of change less than the first amount of change; and modifying operation of the communication network based upon the failure.

14. The system of claim 13, comprising:

in response to the impact exceeding a degradation threshold, modifying operation of one or more communication devices within the communication network.

15. The system of claim 13, comprising:

utilizing a machine learning model to evaluate the alarm in real-time in response to the alarm being generated, wherein the machine learning model generates a predicted impact of the failure upon the user equipment; and modifying operation of one or more communication devices within the communication network based upon the predicted impact.

16. The system of claim 13, comprising:

identifying a stable energy level interval as an interval between a first change point and a second change point where less than a threshold deviation of energy consumption occurs during the interval.

17. A non-transitory computer-readable medium storing instructions that when executed facilitate performance of operations comprising:

identifying an alarm of a failure of a communication device within a communication network;

evaluating energy consumption data, over a time interval, that includes an alarm timestamp of the alarm to identify change points in energy consumption, wherein a change point corresponds to a difference in energy consumption levels from one energy consumption measurement to another energy consumption measurement exceeding a threshold;

utilizing the change points to identify stable energy level intervals, wherein a first stable energy level interval occurs before the change point and a second stable energy level interval occurs after the change point;

sampling a key performance indicator along the first stable energy level interval as a first key performance indicator sample;

sampling a key performance indicator along the second stable energy level interval as a second key performance indicator sample; and comparing, utilizing a machine learning model, (i) the first key performance indicator sample associated with the first stable energy level interval and (ii) the second key performance indicator sample associated with the second stable energy level interval to determine an impact of the failure upon user equipment connected to the communication network.

18. The non-transitory computer-readable medium of claim 17, wherein the operations comprise:

sampling a plurality of key performance indicators for different bands supported by the communication device and for multiple sectors to create a plurality of key performance indicator samples; and utilizing the plurality of key performance indicator samples to identify the impact of the failure.

19. The non-transitory computer-readable medium of claim 17, wherein the operations comprise:

sampling a plurality of key performance indicators for an adjacent band not supported by the communication device to create a plurality of key performance indicator samples; and utilizing the plurality of key performance indicator samples to identify the impact of the failure.

20. The non-transitory computer-readable medium of claim 17, wherein the operations comprise:

for a band supported by the communication device:

calculating a first average of sample key performance indicator points along the first stable energy level interval;

calculating a second average of sample key performance indicator points along the second stable energy level interval; and determining whether a difference between the first average and the second average exceeds a threshold.

* * * * *